United States Patent [19]
Nieswandt et al.

[11] 3,905,946
[45] Sept. 16, 1975

[54] EXTRACTION OF POLYLACTAMS

[75] Inventors: Werner Nieswandt, Weinheim; Werner Hoerauf, Ludwigshafen; Ernst Guenther, Ludwigshafen; Ernst Kissel, Ludwigshafen; Eckart Neumann, Ludwigshafen; Guenter Valentin, Ruchheim, all of Germany

[73] Assignee: Badische Anilin- & Soda-Fabrik Aktiengesellschaft, Ludwigshafen (Rhine), Germany

[22] Filed: Aug. 28, 1973

[21] Appl. No.: 392,244

[30] Foreign Application Priority Data
Aug. 30, 1972 Germany.......................... 2242642

[52] U.S. Cl............. 260/78 L; 260/78 P; 260/96 R
[51] Int. Cl.².......................................... C08G 69/46
[58] Field of Search ...... 260/78 L, 78 P, 78 S, 96 R

[56] References Cited
UNITED STATES PATENTS

| | | | |
|---|---|---|---|
| 3,245,964 | 4/1966 | Wiesner ........................... | 260/78 L |
| 3,374,207 | 3/1968 | Ryffel et al...................... | 260/78 L |
| 3,598,537 | 8/1971 | Kraft .......................... | 260/78 L UX |
| 3,639,659 | 2/1972 | Nieswandt et al................. | 260/78 L |

*Primary Examiner*—Lucille M. Phynes
*Attorney, Agent, or Firm*—Johnston, Keil, Thompson & Shurtleff

[57] ABSTRACT

Continuous extraction of polylactam granules for the removal of monomers and/or oligomers therefrom by means of hot water flowing countercurrently in an extraction zone, which extraction zone is divided into subzones by at least one heating zone and the water is accelerated, at certain time intervals, cocurrently and countercurrently to the flow of granules.

10 Claims, No Drawings

EXTRACTION OF POLYLACTAMS

This invention relates to the continuous extraction of polylactam granules containing monomers and/or oligomers using hot water in a countercurrent.

It is known to extract monomeric or oligomeric lactams from polylactam granules using hot water countercurrently. However, the prior art processes are unsatisfactory as regards the efficiency and uniformity of extraction and the concentration of lactam in the aqueous extract.

It is an object of the invention to provide a process which affords efficient and uniform extraction of the granules and gives a high concentration of lactam in the extract-containing water. This object is achieved by a countercurrent process for the continuous extraction of polylactam granules containing monomers and/or oligomers using water heated at temperatures above 80°C, which water flows upwardly through a substantially vertical extraction zone whilst the granules of polylactam pass downwardly through said extraction zone, the temperature of which is higher at the top than at the bottom, wherein the extraction zone is divided into subzones by at least one heating zone, the density of the water containing extractables in a subzone above a heating zone being less than that of the water in the subzone immediately below said heating zone by at least 0.0002, the top heating zone dividing the entire extraction zone so as to give a ratio of zone lengths on each side thereof of from 50:50 to 85:15 with the shorter section at the upper end of the extraction zone, and wherein the overall upward flow of water is alternatively accelerated cocurrently and countercurrently to the flow of polylactam granules, at certain time intervals.

Suitable polylactams are generally those which have been obtained by polymerization of lactams of from 4 to 12 carbon atoms, such as caprylolactam, laurolactam and, in particular, caprolactam, or those obtained from the corresponding carboxylic acids. Polycaprolactam is particularly suitable.

In general, the polylactams have a molecular weight making them suitable for melt-spinning. The polylactams usually have relative viscosities of from 1.5 to 5, as measured on a 1% solution in 96% sulfuric acid at 25°C. The size of the granules is generally between 1 and 5 mm and more particularly between 1.5 and 3.5 mm. Usually, the polylactams contain up to from 10 to 12% by weight of monomeric and/or oligomeric lactams such as dimeric, trimeric or tetrameric lactams derived from the manufacturing process.

Extraction is carried out in a substantially vertical extraction zone. Suitable reaction zones are for example towers having internal diameters of up to some meters, for example from 0.5 to 3 meters. The granules of polylactams move downwardly through the extraction zone, whilst the water moves countercurrently upwardly therethrough. In general, gravity forces are sufficient to produce comparatively slow sinking of the granules.

The extraction zone is divided into subzones by at least one and preferably at least two heating zones. Such a heating zone heats the upwardly flowing water to such an extent that its density above such a heating zone is less than its density immediately below said heating zone by at least 0.0002 and in particular by from 0.0005 to 0.004, in spite of its greater content of extracted material. The heating zone or, in the case of a number of heating zones, the top heating zone divides the entire extraction zone into two sections having a ratio of lengths of from 50:50 to 85:15 and in particular from 60:40 to 80:20, the shorter section being at the top of the extraction zone. The above ratio of lengths still holds when more than one heating zone is present. It is convenient to provide additional heating zones so as to subdivide the longer section into subzones of appropriate lengths.

The length of the heating zone or zones is conveniently from 1/7 to 1/20 of the total length of the extraction zone. The heating zone conveniently has a number of constrictions in its cross-section. For example, it may be in the form of a tubular heat exchanger.

The extraction zone is conveniently heated externally and possesses good thermal insulation in order to avoid heat losses. It is advantageous for the external heating to be correlated with the rising temperature in the extraction zone. In general, the length of the extraction zone is many times, say from 5 to 40 times, its diameter.

It is desirable, if only on account of accelerated infusion, to use water as hot as possible in the extraction zone, i.e. water or aqueous extract which is just below its boiling point. Since the specified density differences are effected by temperature leaps in the heating zones, the required temperature of the water entering the extraction zone at the bottom is governed by the desired temperature in the top subzone. Temperatures in the top subzone of from 95° to 99°C have proved successful. A successful way of achieving the required density difference between the extraction water has proved to be the establishment of a temperature differential of from 5° to 9°C and in particular of from 6° to 8°C by the top heating zone. Where additional heating zones are present, the temperature differentials produced thereby need generally be only from 2° to 4°C. The heating zones serve to prevent back-mixing of the water present in the upper partial zone and containing more extract with the water present in the subzone below the heating zone. We have found it convenient to introduce the water to the extraction zone at a temperature of from 80° to 93°C and in particular from 85° to 90°C.

Of paramount importance is the heating zone located at the top of the extraction zone. In the upper subzone formed thereby, a high percentage of monomers or oligomers migrate from the granules into the water on account of the high temperature of the extraction water and the high concentration of monomers or oligomers in the polylactam granules. In this upper subzone, the density of the aqueous extract solution is relatively high. In order to avoid back-mixing with the water in the subzone immediately below said heating zone, the temperature leap produced by the heating zone is relatively high, as stated above.

Although a single heating zone in the extraction zone effects substantial extraction of the granules, the extracting effect may be increased by the presence of one or more additional heating zones located below the first heating zone.

Determination of the density of the extract-containing water in the individual subzones may be effected in conventional manner. The temperature difference required to give the desired density difference on the two sides of the heating zone or zones may be determined by taking samples from the subzones or by simple experiment.

In general, extraction is carried out at atmospheric pressure, and consequently the upper limit of the water temperature is the normal boiling point of about 100°C. In principle however, it is possible to operate at higher temperatures, say up to 120°C, and at the corresponding superatmospheric pressures.

The rate of descent of the granules is relatively slow, being from about 0.2 to 5 cm/min and in particular from 0.4 to 2 cm/min. The rate of ascent of the water is conveniently from 0.5 to 20 cm/min and in particular from 1.0 to 10 cm/min.

The level of the water in the extraction column may be simply regulated by the provision of overflow means above the extraction zone. The granules should always be covered by a certain depth of water.

It is important that the stream of water should show acceleration at certain time intervals alternately cocurrently and countercurrently to the flow of granules. A simple way of achieving this effect is, for example, to cause the water to flow through the granules for a short time at a speed which is greater than its mean speed and then to allow it to descend together with the granules. It is desirable, however, that the descent of water should never exceed the descent of granules so that the granules become exposed, i.e. the granules should always be covered by a certain depth of water above the extraction zone.

It has been found convenient to accelerate the water countercurrently to the granules to such an extent that its speed is then many times greater, for example from 10 to 60 times and in particular from 20 to 50 times greater, than its mean speed of ascent. Acceleration of the water cocurrently with the stream of granules is conveniently effected by gravity. The intervals at which said acceleration are carried out are generally from 0.5 to 180 minutes and in particular from 1 to 20 minutes. They are governed, for example, by the amount of water to be accelerated and the length of the reaction zone. The ratio of granules to water, by weight, is conveniently from 1:0.6 to 1:2.5 and in particular from 1:1 to 1:1.8, based on non-extracted granules. This ratio is governed by the desired concentration of lactam in the extract-containing water and in the extracted granules.

However, the volume of water accelerated with and against the flow of granules should not exceed a value at which the heating zone or zones lose their barrier effect, i.e. there should be no backmixing of water from an upper subzone with water in the next subzone beneath it.

Since it is economically advantageous to use a little water as possible for extracting the granules, the speed of the water relative to that of the granules is low. This could lead to zones of preferential and neglected flow paths. The regular surges of water produce a more even flow of water through the granules, which ensures more uniform extraction of the granules, since this measure causes the water to flow at higher speeds alternately in both directions over short periods. This produces extraction of monomers or oligomers from the granules to the surrounding water.

If desired, extraction may be carried out under a protective gas, although the protective atmosphere produced by the water vapor is generally sufficient.

Discharge of the extreacted polylactam granules from the extraction zone may be effected by conventional means. The granules are then dried in the usual manner.

The process of the invention enables continuous extraction to be carried out over long periods. Since the heating zone or zones prevent back-mixing of the extract-containing water between the subzones, extraction is very uniform, this being an important factor when it is desired to use the material for spinning purposes. It is also possible to operate at a very advantageous ratio of granules to water. This is particularly desirable, since it is uneconomical to work up large volumes of extract-containing, weakly concentrated water to lactam or oligomers, and large volumes of such water would lead to unacceptable waste water pollution.

EXAMPLE

In a vertical extraction column (height 20 m, internal diameter 1.9 m) polycaprolactam granules (relative viscosity 2.4, cylindrical granules having a diameter of 2.5 mm, a length of 2.7 mm and a bulk density of 0.64 kg/dm$^3$) are continuously passed downwardly under their own weight at a rate of 0.8 cm/min, water being continuously passes upwardly therethrough.

The extraction zone is divided into three subzones by two similar heating zones. Densities in the three subzones are as follows:

upper subzone 0.9640,
middle subzone 0.9661,
lower subzone 0.9672.

These density differences prevent back-mixing of extract-containing water in a subzone with the water in a subzone immediately below. The temperatures in the subzones are 98°C, 91°C and 88°C respectively. The ratio of the zone lengths, in the same order, is 33:17:50.

The mean velocity of the water ascending through the extraction zone is 1.6 cm/min. At intervals of 3 minutes, 50% of the water contained in one of the heating zones is pumped through the extraction zone at 40 times the mean velocity, the level of the water in the extraction column being maintained at about 100 cm above the uppermost granules by means of an overflow device. After each such surge of water, it is allowed to descend together with the granules but only to such an extent that the granules remain covered by a layer of water.

The ratio by weight of granules to water is 1:1.1. The granules used initially have a content of extractables of 11% w/w and the extracted granules obtained have a content of 0.4% w/w.

We claim:
1. A process for the extraction of monomer-containing and/or oligomer-containing polylactam granules which comprises continuously extracting polylactam granules with a countercurrent of water at temperatures above 80°C, under the following conditions:
   a. the water flows upwardly through a substantially vertical extraction zone at a mean of from 0.5 to 20 cm/min and the polylactam granules pass downwardly through said extraction zone at a rate of from 0.2 to 5 cm/min,
   b. the temperature at the upper end of the extraction zone is higher than at its lower end,
   c. the extraction zone is divided into subzones by at least one heating zone so that the density of the water containing extractables in an upper subzone is lower than that of the water contained in the subzone immediately below by at least 0.0002, d. the uppermost heating zone divides the entire extraction zone into lengths bearing a ratio to each other of from 50:50 to 85:15, the shorter section being at the upper end of the extraction zone, and e. the water, which shows an overall ascent through the extraction zone, is accelerated at intervals of from 0.5 to 180 minutes alternately cocurrently and countercurrently to the flow of polylactam granules.

2. A process as claimed in claim 1, wherein polycaprolactam granules are extracted.

3. A process as claimed in claim 1, wherein the extraction zone is divided into subzones by at least two heating zones.

4. A process as claimed in claim 1, wherein the density of the water containing extractables in a subzone lying above a heating zone is lower than that of the water contained in the subzone immediately below by from 0.0005 to 0.0004.

5. A process as claimed in claim 1, wherein the water is accelerated at intervals of from 1 to 20 minutes.

6. A process as claimed in claim 1, wherein the water showing an overall ascent is accelerated at intervals to a speed which is from 10 to 60 times as great as its mean speed.

7. A process as claimed in claim 1, wherein said heating zone or the total of said heating zones constitute 1/7 to 1/20 of the length to the vertical extraction zone.

8. A process as claimed in claim 7 wherein said heating zone or zones respectively constitute a tubular heat exchanger with tubes of constricted cross-section.

9. A process as claimed in claim 1 wherein the temperature of the water in the upper subzone is 95°–99°C., and the temperature of the water in the next lower subzone is 5°–9°C. below the water temperature in said upper zone.

10. A process as claimed in claim 1, wherein the extraction zone is divided into subzones by at least two heating zones, the temperature of the water in the upper subzone is 95°–99°C., and the temperature of the water in the next lower subzone is 5°–9°C. below the water temperature in said upper zone, and the temperature of the water in the next lower subzone or successive, lower subzones is 2°–4°C. below the water temperature of the subzone immediately thereabove.

* * * * *